(12) United States Patent
Dumler et al.

(10) Patent No.: US 7,509,238 B1
(45) Date of Patent: Mar. 24, 2009

(54) COMPUTER PROGRAM FOR WATER TREATMENT DATA MANAGEMENT

(75) Inventors: Stephen Dumler, Colleyville, TX (US);
Blaine Nagao, Colleyville, TX (US);
Adam Dumler, Bedford, TX (US);
David Hollabaugh, Grapevine, TX (US)

(73) Assignee: H2tr0nics, Inc., Grapevine, TX (US)

(*) Notice: Subject to any disclaimer, the term of this patent is extended or adjusted under 35 U.S.C. 154(b) by 310 days.

(21) Appl. No.: 11/166,420

(22) Filed: Jun. 24, 2005

Related U.S. Application Data

(60) Provisional application No. 60/663,775, filed on Mar. 21, 2005, provisional application No. 60/583,210, filed on Jun. 25, 2004.

(51) Int. Cl.
*G06F 19/00* (2006.01)
*G06F 17/40* (2006.01)

(52) U.S. Cl. .................. 702/188; 340/500; 340/540; 340/679; 702/33; 702/34; 702/182; 702/187; 715/275; 715/700; 715/764

(58) Field of Classification Search .............. 702/31, 702/33, 34, 127, 182, 183, 184, 185, 186, 702/187, 188, 189, 1; 340/500, 540, 635, 340/679, 870.01, 870.16; 345/418, 581, 345/589, 593, 594; 715/200, 212, 219, 220, 715/273, 275, 700, 764
See application file for complete search history.

(56) References Cited

U.S. PATENT DOCUMENTS

| | | | | |
|---|---|---|---|---|
| 2,883,255 A * | 4/1959 | Anderson | ................... | 346/34 |
| 4,812,994 A * | 3/1989 | Taylor et al. | ................ | 705/410 |
| RE35,793 E * | 5/1998 | Halpern | ....................... | 702/62 |
| 5,930,773 A * | 7/1999 | Crooks et al. | ................ | 705/30 |
| 6,144,962 A * | 11/2000 | Weinberg et al. | ............ | 707/10 |
| 6,237,006 B1 * | 5/2001 | Weinberg et al. | ....... | 707/103 R |
| 6,526,215 B2 * | 2/2003 | Hirai et al. | ..................... | 386/52 |
| 6,560,543 B2 * | 5/2003 | Wolfe et al. | .................... | 702/22 |
| 6,975,968 B2 * | 12/2005 | Nakamitsu et al. | .......... | 702/184 |
| 7,315,985 B1 * | 1/2008 | Gauvin et al. | .............. | 715/734 |
| 7,430,593 B2 * | 9/2008 | Baldwin et al. | ............ | 709/223 |
| 2002/0105409 A1 * | 8/2002 | Nakamitsu et al. | .......... | 340/3.1 |
| 2002/0117401 A1 * | 8/2002 | Breen et al. | ................. | 205/725 |
| 2005/0086064 A1 * | 4/2005 | Dively et al. | .................. | 705/1 |
| 2007/0132779 A1 * | 6/2007 | Gilbert et al. | .............. | 345/619 |
| 2007/0139441 A1 * | 6/2007 | Lucas et al. | ................. | 345/619 |
| 2007/0165031 A1 * | 7/2007 | Gilbert et al. | .............. | 345/473 |
| 2007/0179641 A1 * | 8/2007 | Lucas et al. | ................... | 700/83 |

OTHER PUBLICATIONS

Metal Samples Corrosion Monitoring Systems, "Corrosion Data Management Software," Feb. 6, 2003 (Version 3.1.7), Version 3.1.3, p. 13.*

* cited by examiner

*Primary Examiner*—Edward R Cosimano
(74) *Attorney, Agent, or Firm*—Anderson, Levine & Lintel, LLP; Stephen L. Levine

(57) ABSTRACT

A computer program for operating a computer to perform various steps. In one step, the program causes the computer to display to a user of the computer a first hierarchical level representative of one or more companies, where each company of the one or more companies has respective water treatment needs. In another step, and for each company of the one or more companies, the program causes the computer to display to the user of the computer a second first hierarchical level representative of one or more facilities for the respective company. In another step, and for each facility of each company of the one or more companies, the program causes the computer to display to the user of the computer a third hierarchical level representative of one or more water treatment systems for the respective facility.

53 Claims, 11 Drawing Sheets

*FIG. 7A*

| | | Central Utilities Plant → Cooling and Closed Loop Systems | | |
|---|---|---|---|---|
| Test | City Water | Cooling Tower | Chill Loop | Hot Loop |
| Hardness, calcium (ppm as $CaCO_3$) | 110 | 525 | $75_1$ | |
| Limits $65_1$ | 60-100 | 50-500 | | |
| Hardness, total (ppm as $CaCO_3$) | 170 | 725 | $75_2$ | |
| Limits | 30-150 | 50-600 | | |
| Alkalinity, M (ppm as $CaCO_3$) $65_3$ | 80 | 65 | | |
| Limits | 60-100 | 50-500 | | |
| Conductivity (as mmhos) | 325 | 1125 | 2400 | 1000 |
| Limits | 250-350 | 1000-1300 | 800-3000 | 800-1200 |
| pH | 7.8 | 8.7 | | |
| Limits | 7-8.5 | 8-9.5 | | |
| Molybdale (ppm as Mo) | | 0.05 | $75_6$ | |
| Limits | | 0.5-0.7 | | |
| Chlorine, free (ppm as $Cl_2$) | | 0.1 | | |
| Limits | | 0.2-0.5 | | |
| Chlorine, total (ppm as $Cl_2$) | | 0.75 | | |
| Limits | | 0.5-1.5 | | |

User: John Doe

- Home ($40$)
- Product List
- Global Attachments ($50_1$)
- Report Phrases ($50_2$)
- Change Password ($50_3$)
- Admin ($50_4$)
- Help Center ($50_5$)
- Logout ($50_6$, $50_7$, $50_8$)

ServiceReport — Back, eMail, Print ($30$)

Veterans Hospital, Redmund Facility
1405 Maple Ave.
Redmund, WA 86066  (807)504-4517

Recorded By: Joe Smith, jsmith@damo.com
(807)405-8815
Report Date: February 26, 2005 4:53:54 PM $D_5$

TO FIG. 7B

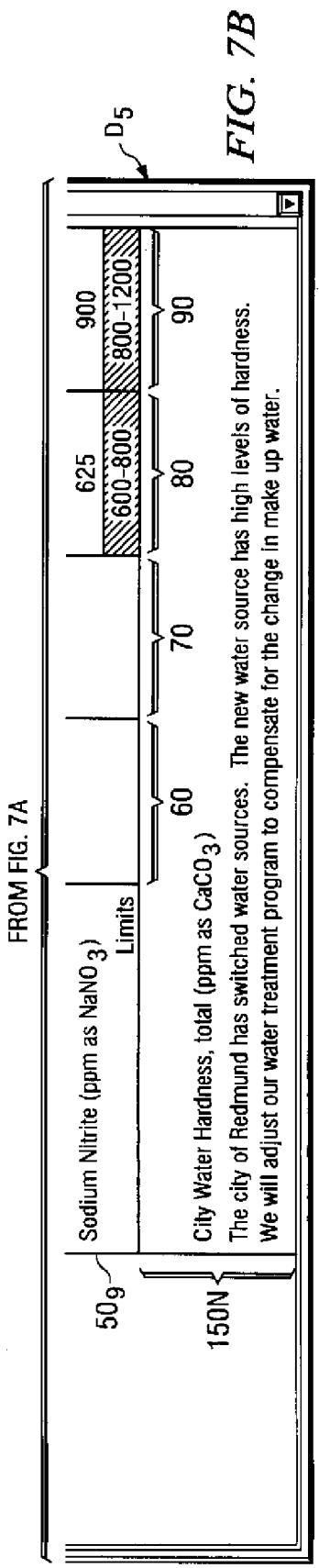

FIG. 10

COMPUTER PROGRAM FOR WATER TREATMENT DATA MANAGEMENT

CROSS-REFERENCES TO RELATED APPLICATIONS

This application claims priority under 35 U.S.C. § 119 of U.S. Provisional Application No. 60/583,210, filed Jun. 25, 2004, now expired.

This application claims priority under 35 U.S.C. § 119 of U.S. Provisional Application No. 60/663,775, filed Mar. 21, 2005, now expired.

STATEMENT REGARDING FEDERALLY SPONSORED RESEARCH OR DEVELOPMENT

Not Applicable.

BACKGROUND OF THE INVENTION

The present embodiments relate to computer programs and are more particularly directed to a computer program for water treatment data management and related functionality.

Water treatment at the commercial and industrial levels involves various levels of complexity, relying in large part on the collection of sample data and analysis of such data. The treatments are typically directed to the control of deposits, scale, corrosion, and microbiological growth in the commercial and industrial water systems. The data from such treatment may come from different systems, components of those systems, and the water and chemicals as they pass through those systems. In this endeavor, a company treating its water for one or more applications may manage its own water treatment or may do so with partial or complete assistance from an outside entity. In any event, successful water treatment requires the measuring and recording of various water and related attributes to ensure along with later calculations and analysis that an applied product or product(s) is serving its purpose and thereby maintaining the affected water in a manner suitable for the water system application.

In the current state of the art, typically one or more persons are responsible for periodically measuring certain attributes of a treated water system, and then those same or different persons analyze the results of the measurements. Often the measurements are taken by hand and recorded in a journal, ledger, or the like. Thereafter, the recorded measurements may be analyzed, with a certain amount of time having elapsed between the time of the measurement and the subsequent analysis. The collection of the recorded measurements in a manner that is sufficiently efficient and workable may depend on the habits of the person(s) performing the analysis, and with an increased manual involvement there is of course an increase in the likelihood of human error. Also, the technique(s) for responding to the results of the analysis also are typically left to the judgment of humans and, thus, may vary considerably.

Given the preceding, the analysis and success of water treatment may vary considerably based on the organizational skills of the individual(s) involved in that process. Thus, there arises a need to address the drawbacks of the prior art. The preferred embodiments, therefore, seek to improve upon such analysis and success by providing a novel computer program interface and methodology to collect, analyze, and respond to water treatment measurement data, where such data may include measures taken from the water, and products and inventory relating to water treatment, including also so-called coupons used to evaluate the efficacy of certain water treatment processes.

BRIEF SUMMARY OF THE INVENTION

In one preferred embodiment, there is a computer program for operating a computer to perform various steps. In one step, the program causes the computer to display to a user of the computer a first hierarchical level representative of one or more companies, where each company of the one or more companies has respective water treatment needs. In another step, and for each company of the one or more companies, the program causes the computer to display to the user of the computer a second hierarchical level representative of one or more facilities for the respective company. In another step, and for each facility of each company of the one or more companies, the program causes the computer to display to the user of the computer a third hierarchical level representative of one or more water treatment systems for the respective facility.

Numerous other aspects are also disclosed and claimed.

BRIEF DESCRIPTION OF THE SEVERAL VIEWS OF THE DRAWING

FIGS. 7A and 7B illustrate a screen display $D_5$ that is the preferable GUI projected to the user and that is provided to a service person when they select the option to create a data report.

FIG. 10 illustrates a screen display $D_7$ that is the preferable GUI projected to the user for sake of permitting the user to input data measurements with respect to a water treatment coupon and to then or thereafter view analyses of the coupon degradation based on the input data measurements.

DETAILED DESCRIPTION OF THE INVENTION

The preferred embodiments relate to a computer program operable in connection with sufficient supporting computer hardware and/or software to receive, process, report on, and respond to various data relating to water treatment, treatment products, and inventory. By way of background, water treatment applications involve various steps and products (e.g., chemicals) in various water systems. However, the manner of perceiving such uses and characterizing them may vary depending on the opinion of an individual seeking to collect data with respect to such treatments. In the preferred embodiment, a particular hierarchy is established so as to achieve the goals set forth above. In other words and as detailed below in connection with FIG. 1, the preferred embodiment program is configured based on the present inventors' identification of a water treatment application as well as a logical framework selected by the inventors for implementing the above-introduced functionality while also providing an intuitive interface for users of the program.

Figure 1:
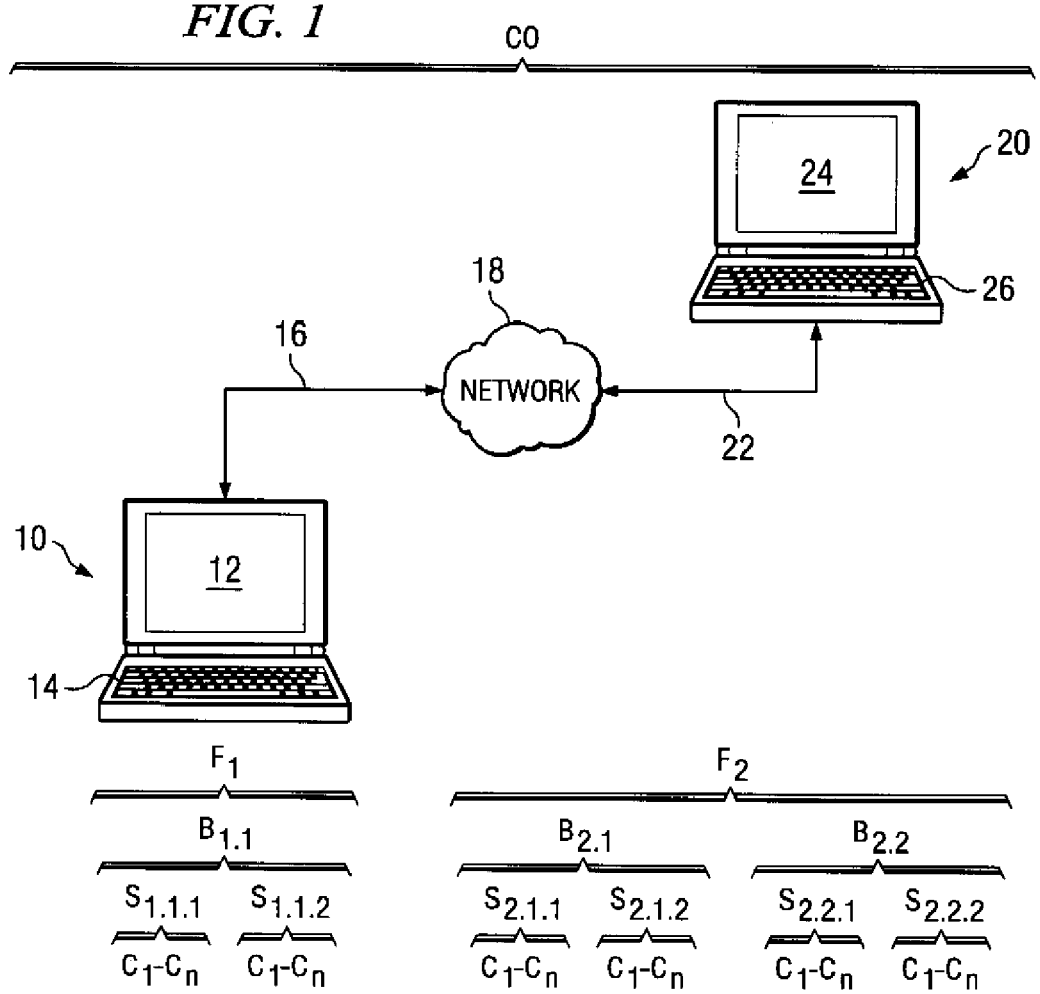
FIG. 1 illustrates a logical hierarchy of a company CO recognized in connection with the preferred embodiments as well as computing devices for operating per the preferred embodiment computer program.

In accordance with the preferred hierarchy of examining water treatment and also as used in the preferred embodiment program described later, FIG. 1 illustrates a company CO that has water treatment needs. For sake of an example used in the remainder of this document (unless stated otherwise), assume that company CO is in the business of managing hospitals. Also, while FIG. 1 illustrates only a single company, in many instances water treatment may be performed by a vendor or the like that services more than one company. The preferred embodiment program also comprehends this possibility by providing an interface and functionality with respect to different companies, but for sake of simplifying the example only one company is shown in FIG. 1. Also in the example of FIG. 1, company CO has two facilities $F_1$ and $F_2$, where by way of example, each facility $F_1$ or $F_2$ is at a different geographic location such as in a different city. At each facility, there are one or more buildings, and for sake of example FIG. 1 thus illustrates one building $B_{1.1}$ at facility $F_1$, and two buildings $B_{2.1}$ and $B_{2.2}$ at facility $F_2$. Each facility has a number of systems, where in the example of a hospital such systems may be: (i) a boiler and pre-treatment system; and (ii) a cooling closed loop system. Thus, in FIG. 1, each building is shown to have two systems, designated system $S_{1.1.1}$ and $S_{1.1.2}$ at building $B_{1.1}$, system $S_{2.1.1}$ and $S_{2.1.2}$ at building $B_{2.1}$, and system $S_{2.2.1}$ and $S_{2.2.2}$ at building $B_{2.2}$. A system may be described in general as a group of components that relate to each other (e.g., a chiller is related to chillwater; or a boiler is related to a condensate return), and additional examples of systems are shown in the following Table 1:

TABLE 1

System examples

| | | |
|---|---|---|
| Pre-treatment system | Cooling tower system | Boiler water system |
| Closed loop system | | |

Each system may have one or more components as part of the water system. A component may be described in general as a piece of equipment to which the set of analytical tests is applied. Such components by way of example in the instance of a hospital may include, for the case of a boiler and pre-treatment system, each of city water, feed water, a softener, a boiler, and a condensate return. Also for the instance of a hospital, but in the case of its cooling system, the components may include city water, a cooling tower, a chill loop, and a hot loop. Additional examples of components are shown in the following Table 2:

TABLE 2

Component examples

| | | |
|---|---|---|
| Cooling Tower | Feed water | Condensate Return |
| Hot Loop | Softener | City Water |
| Chill Loop | Boiler | Processed Chill Water Loop |

Lastly, for sake of simplifying the drawing, FIG. 1 does not identify each different component, but shows generally n components (i.e., $C_1$-$C_n$) at each system, with it understood that the variable n may differ for each system.

Given the logical orientation recognized in FIG. 1, it is anticipated in connection with the preferred embodiment that a person will make measurements in components at each system of company CO and provide those measurements to the preferred embodiment computer program. By way of further introduction to these steps, in the preferred embodiment a user of the program may access the program with a computing device 10 shown in block form at facility $F_1$. Computing device 10 may be of various forms now available or hereafter developed, where typically such a device includes various components that are typically internal within the device's outer enclosure, including at least a processor and a readable medium such as memory with input/output to a storage peripheral that may include various forms (e.g., hard or soft or optical disk or other storage medium), where the memory may temporarily store part or all of the preferred embodiment computer program. Computing device 10 also includes a display 12 and an input device 14, such as a keyboard or touch screen, where the latter may share functionality with display 12. Also in the preferred embodiment, computing device 10 includes an interface 16 for coupling it to a network 18 so that data may be bi-directionally communicated between computing device 10 and network 18, where the interface may be one of various forms, including either a hard-wire connection or a wireless connection. For example, computing device 10 may be coupled to a local area network ("LAN") serving as network 18, or alternatively computing device 10 may be coupled through such a LAN or directly to a larger network, including the global Internet. In any case, also in the preferred embodiment, the computer program described in this document is located on a network computer 20 (e.g., server) coupled to network 18 and, which like device 10, also preferably includes an interface 22 to the network, as well as at least a processor, a readable medium, and input/output to a storage peripheral that may include various forms, a display 24, and an input device 26, such as a keyboard or touch screen. In any case, preferably water measurement and related data is communicated from computing device 10 to the program on network computer 20, whereby much of the data analysis is performed on network computer 20 with the results returned to computing device 10, so that, for example, a user may see the data input and response on display 12 of computing device 10. Alternatively, computing device 10 may store part or all of the preferred embodiment program in its memory, where also network computer 20 may communicate that program data to computing device 10 or the program may be loaded locally. As yet another alternative, note that the water treatment data processed as described herein may be provided by other devices. For example, a controller may be connected to one or more components and operate to automatically log data, where that logged data may be either real-time or periodically communicated to either computing device 10 or network computer 20 so that various of the functionality described below also may be performed with respect to such data.

Also in the preferred embodiment, other users with access to network computer 20 may access the program described herein, so those users also may take advantage of the program's functionality, including the ability to examine previously communicated water treatment data as well as the analyses performed on such data. Accordingly since a preferred embodiment includes coupling of computing device 10 to the global Internet (either directly or via another network or device), then a user of the program may thus have access to the many functions and features described herein with any manner of accessing the network (e.g., Internet). For example, the user may have a portable computing device that serves as computing device 10 and provides portable access to the Internet (or other network). With such a setup, the user may make a measurement and enter that as an input into computing device 10, thereby also communicating that measurement to the preferred program on network computer 20 without the need to first record the value in a handwritten form. As another option, a portable and electronic data unit may be used as computing device 10, whereby the user makes measurements and inputs them to the unit, with the unit then or thereafter being coupled to the network so as to provide data to, and receive output from, the preferred embodiment program. Lastly, certainly another option, and one that may still have widespread application and desirability, is for a user to record data manually such as in handwritten form and then later access the preferred program via a computer operating as computing device 10 at a generally static location. In all events, as will be shown below, various data may be entered and analyzed, with various results also reported based on such data.

Figure 2:
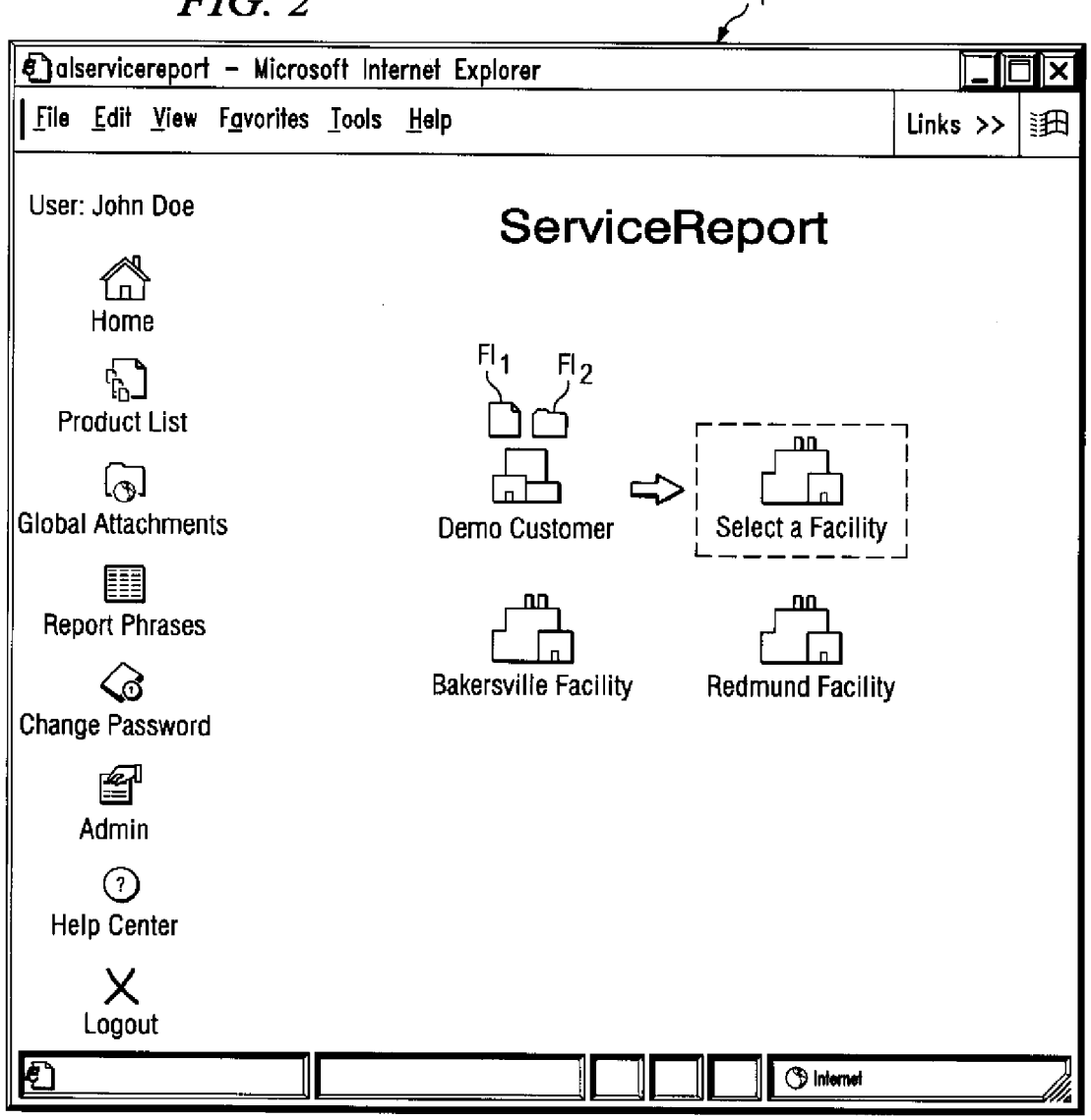
FIG. 2 illustrates a screen display $D_1$ that is the graphical user interface ("GUI") projected to a user once the user has accessed the preferred embodiment computer program.

FIG. 2 illustrates a screen display $D_1$ that is the graphical user interface ("GUI") projected to the user, such as on display 12, per the preferred embodiment program once a user has accessed the program. For example, a user (e.g., John Doe) may be prompted to provide a username and password to a network program such as at a particular network address (or "URL" on the Internet). In the preferred embodiment, the user is then presented with a graphical interface according to the rights given to that username and password. Once logged in, a list of basic functions and the user's identity are listed in a column on the left side of display $D_1$. As to the remainder of the display, and continuing with the example of FIG. 1 of the water treatment of a single company CO, then assuming a user in connection with that company logs in properly, the user is provided display $D_1$ that illustrates in icon form the company CO, where in the example of display $D_1$, customer CO is shown in generic form as a "Demo Customer."

Also in connection with the company icon, as well as other icons that form a hierarchy described later, there are included two floating icons $FI_1$ and $FI_2$. A first such floating icon $FI_1$, which illustrates a notepad, may be selected (e.g., by clicking the icon) to permit the user to input notes at that level, such as editing a contact list for company CO. A second such floating icon $FI_2$, which illustrates a folder, may be selected to permit the user to view attachments to that level. Also shown in display $D_1$, and consistent with the hierarchy described in connection with FIG. 1, are the two facilities $F_1$ and $F_2$, where those two facilities "$F_1$" and "$F_2$" used as generic identifiers in FIG. 1 are replaced with fictitious examples in display $D_1$, namely, with a Bakersville Facility and a Redmund Facility. Thus, a user with access to company CO should have a familiarity with those names as well as an intuitive feel for each icon representing a known location. In any event, from display $D_1$, the user is solicited to select a desired facility by the prompt indicating "Select a Facility," and the user makes this selection such as by clicking on the icon in the GUI for the desired facility with an appropriate pointing device that is associated with device 10 (e.g., mouse, touch pad, or screen detectable pointing device in a touch-sensitive application).

Figure 3:
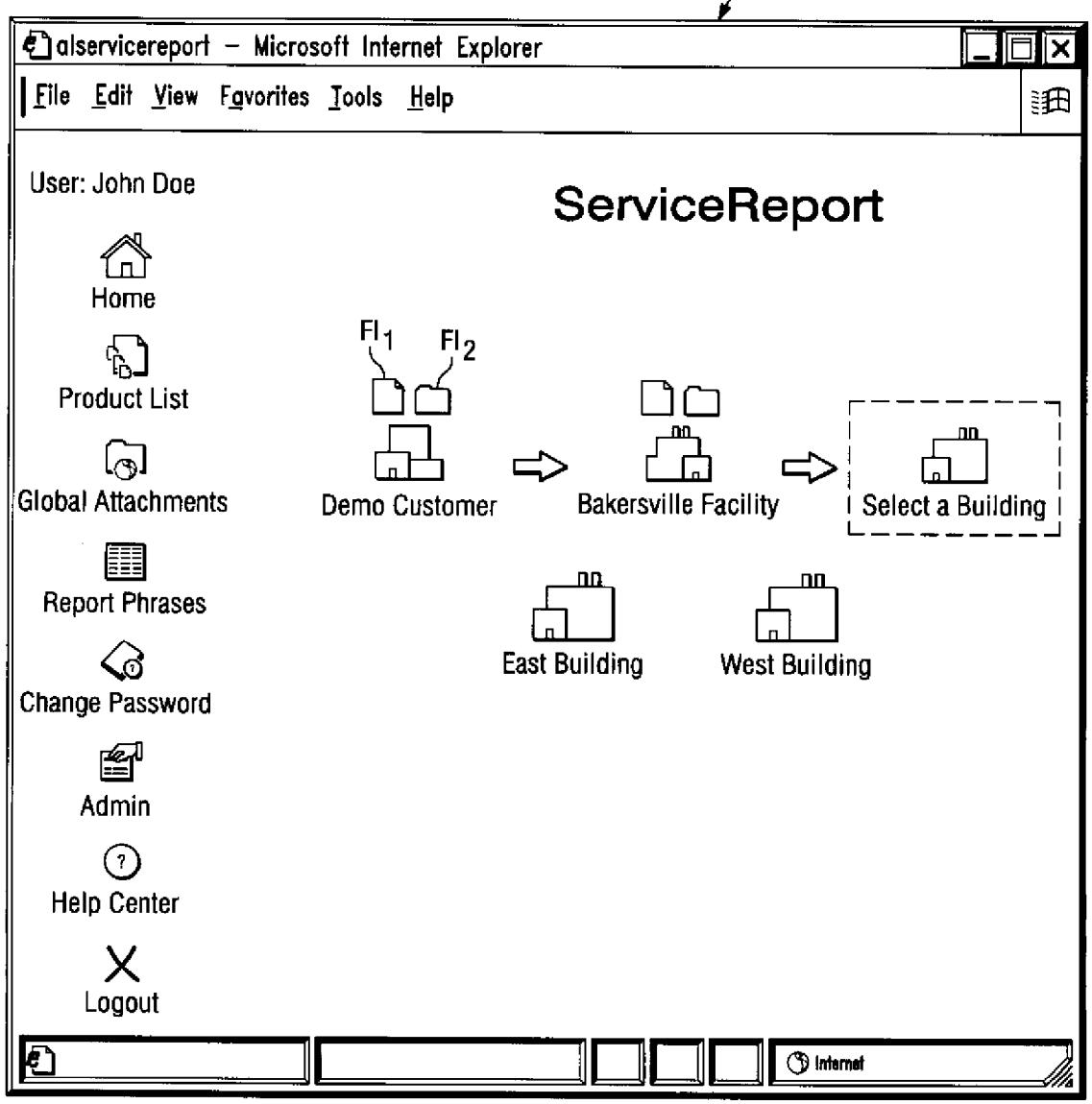
FIG. 3 illustrates a screen display $D_2$ that is the preferable GUI projected to the user following a selection of a facility.

FIG. 3 illustrates a screen display $D_2$ that is the preferable GUI projected to the user, such as on display 12, following a selection of a facility, which by way of example is the selection of the Bakersville facility from display $D_1$ of FIG. 2. Per the logical hierarchy recognized in connection with FIG. 1, display $D_2$ now presents the user with icons representing the buildings at the selected facility $F_1$, where recall from FIG. 1 that those buildings are $B_{2.1}$ and $B_{2.2}$. Again, the use of the designators, $B_{2.1}$ and $B_{2.2}$, in FIG. 1 is for a generic example and instead it is preferred that actual building names are used, so in Figure $D_2$ the buildings are shown as the East Building and the West Building. In addition to the building icons, note also that what will be referred to herein as a hierarchy chain HCH is being developed and is shown across the top of display $D_2$. Particularly, hierarchy chain HCH depicts to the user the selection he or she has made thus far through the logical hierarchy of FIG. 1 and, as further demonstrated in the remainder of this document, hierarchy chain HCH expands consistent with that logical hierarchy. Specifically, the GUI displays to the user company CO (i.e., "Demo Customer"), which was not selected but exists by default in this example because the user is assumed to have access only to that company, followed by an arrow and an icon for the previously-selected facility (i.e., the Bakersville Facility), since the user made that selection in connection with display $D_1$. Also in the preferred embodiment, hierarchy chain HCH provides another arrow and a solicitation to the user to select a desired building at the already-selected facility, by the prompt indicating "Select a Building." Again, the user is to make this selection such as by clicking on the icon in the GUI for the desired building with an appropriate pointing device. Accordingly, in the present example of FIG. 3, assume that the user inputs a selection of one of the two buildings using a pointing device, and for sake of example assume that the East Building is so selected.

Before proceeding, note that hierarchy chain HCH also provides the user an interface by which he or she may backtrack or quickly move to a different point in the logical hierarchy that progresses from company, to facility, to building, to system. Specifically, looking still to display $D_2$ of FIG. 3, note that the user may desire not to select a building but instead to return to the preceding facility tier of the logical hierarchy. In this case, the user may simply select the company icon (e.g., Demo Customer) in hierarchy chain HCH, in which case the preferred embodiment program would return the user to the interface depiction of display $D_1$ in FIG. 2. However, to simplify the present discussion, assume instead that the user has continued with the hierarchy as described in the previous paragraph, by selecting a building (e.g., East Building) from display $D_2$ of FIG. 3.

Figure 4:
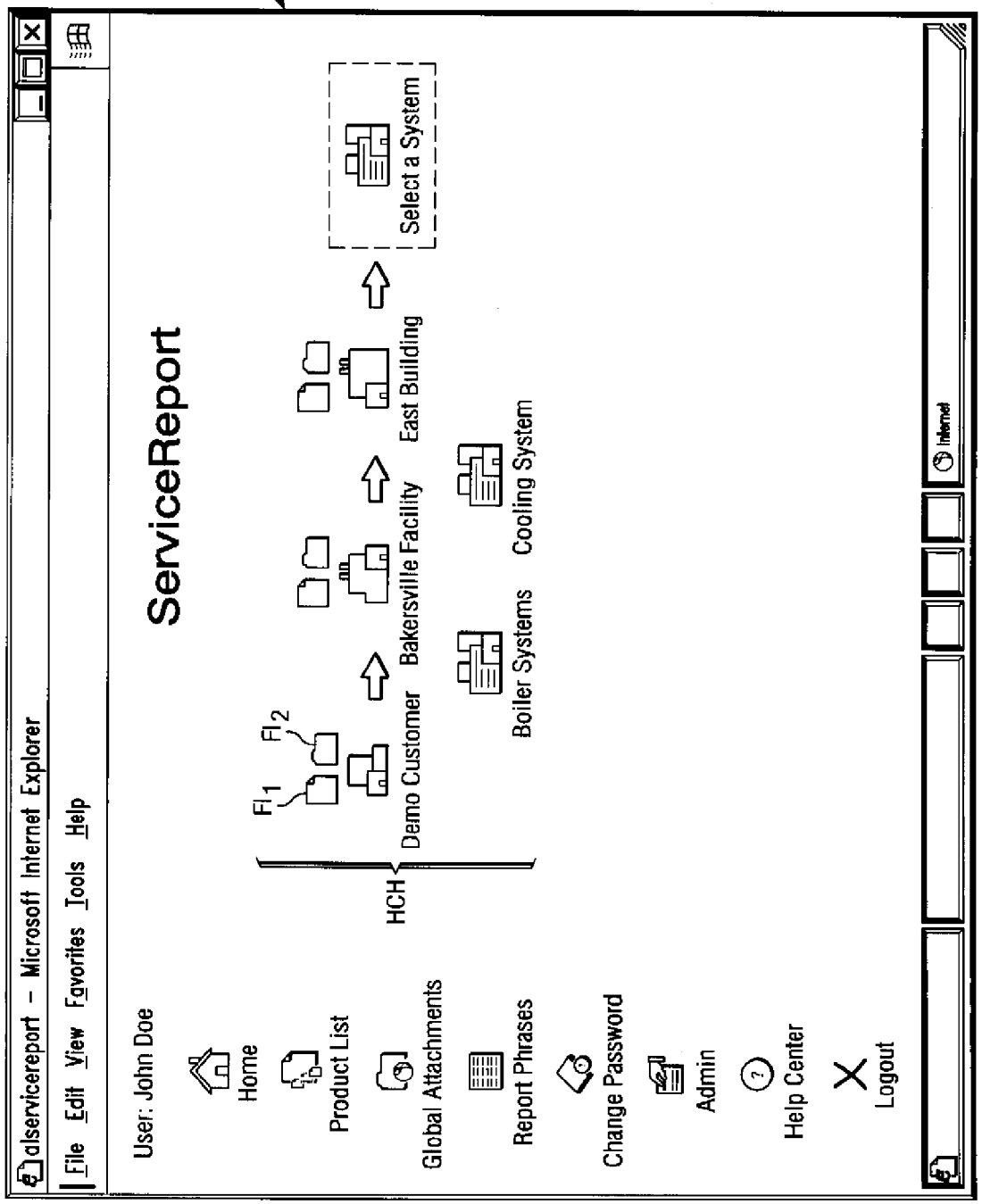
FIG. 4 illustrates a screen display $D_3$ that is the preferable GUI projected to the user following a selection of a building.

Having demonstrated in part the novel and intuitive logical recognition of FIG. 1 as well as the progression of displays $D_1$ and $D_2$ in FIGS. 2 and 3, FIG. 4 may well be appreciated by one skilled in the art as the next step of that progression. Specifically, FIG. 4 illustrates a screen display $D_3$, that is the preferred GUI projected to the user, such as on display 12, following a selection of the East Building by the user when provided with the options of display $D_2$ in FIG. 3. Per the logical hierarchy recognized in connection with FIG. 1, display $D_3$ now presents the user with icons representing the systems at the selected building (i.e., East Building) of the selected facility (i.e., Bakersville Facility) of the selected company CO (i.e., Demo Customer, assuming a company selection was available). In FIG. 4, two systems, are shown by way of example, namely: (i) Boiler Systems; and (ii) Cooling System, where note in (i) that multiple systems are collected and shown as a single system. In addition to the system icons, note also that hierarchy chain HCH is now modified to include additional elements in its arrow-indicated chain. First, hierarchy chain HCH adds to display $D_2$ of FIG. 3 the user's selection of the East Building, and it also provides another arrow and a solicitation of the user's next step, namely, to select a system. Lastly, for sake of example assume that the Boiler Systems are so selected by the user, again by way of example where the user clicks on the icon depicting that potential selection (e.g., depicting the Boiler Systems).

Figure 5:
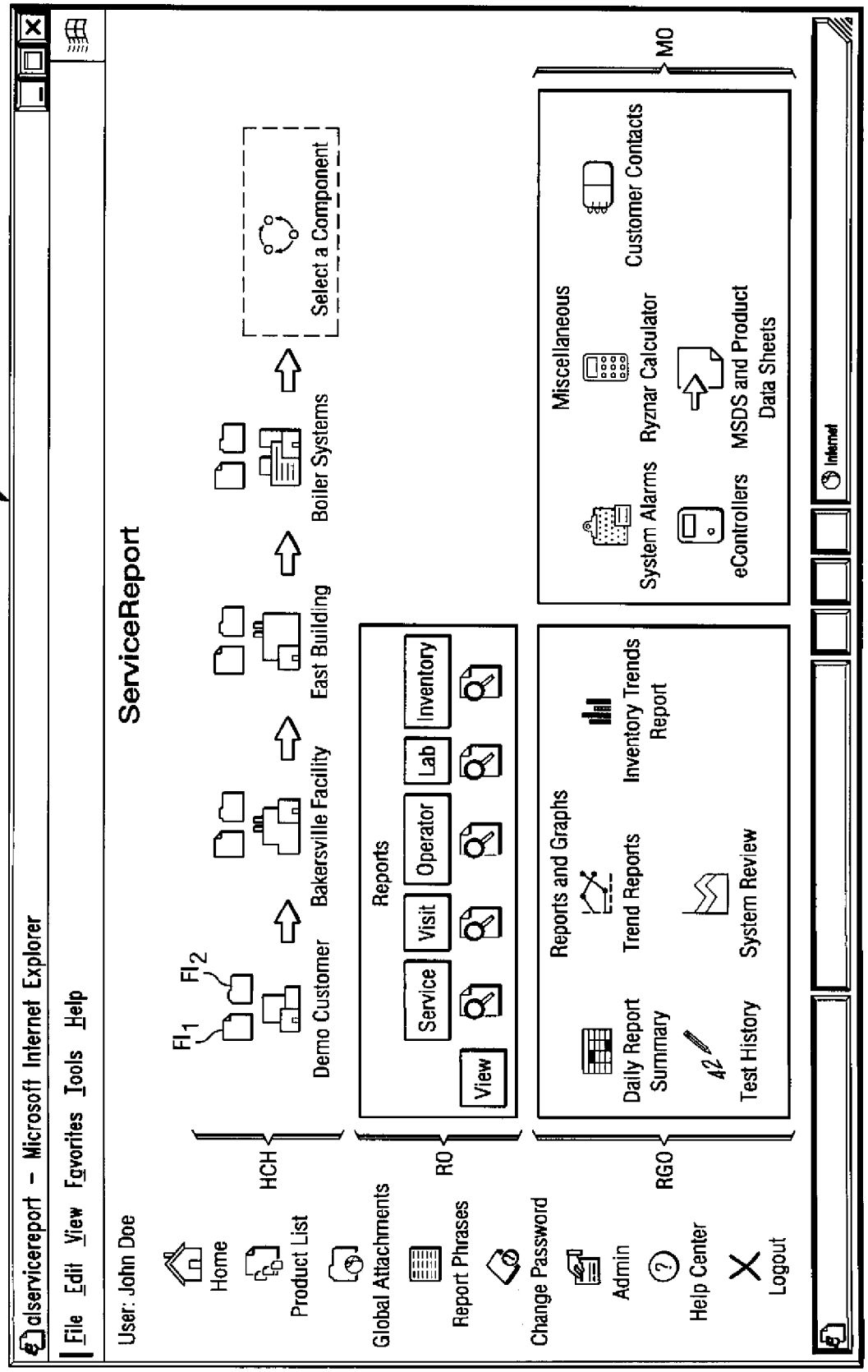
FIG. 5 illustrates a screen display $D_4$, that is the preferable GUI projected to the user following a selection of a system.

FIG. 5 illustrates a screen display $D_4$, that is the preferable GUI projected to the user, such as on display 12, following a selection of the Boiler Systems by the user when provided with the options of display $D_3$ in FIG. 4. Per the logical hierarchy recognized in connection with FIG. 1, hierarchy chain HCH is now updated across the top of display $D_4$ to depict to the user the selection he or she has made thus far through the hierarchical options and also to provide the option to the user, by another arrow and an icon, to make a next step in the hierarchy, namely, to a select component of the selected system. However, in the preferred embodiment and because it is anticipated that there may be numerous (e.g., up to eight) components in a given system, then it is determined at this point in the hierarchy that it is beneficial to now permit the user various options with respect to inputting data or viewing previously-input data and analyses of such data at this system level. Accordingly, in display $D_4$, the user is also provided with numerous other options in addition to the ability to select a system component. Indeed, a large majority of data input, analysis, and review may be made based on selections from display $D_4$. These options are categorized generally as a report option RO, a reports and graphs option RGO, and a miscellaneous option MO. Each of these options is described below in varying levels of details, with particular emphasis on certain aspects and methodologies.

Before proceeding with a discussion of the three option categories addressed above, note that as of display $D_4$, hierarchy chain HCH has now been expanded to include each of the logical items introduced above in connection with FIG. 1, namely, a company, a facility, a building, a system (or collection of systems), and the choice of a component. Thus, one skilled in the art should appreciate the intuitive progression provided by hierarchy chain HCH, and that aspect is now also summarized in a state diagram shown in FIG. 6. Specifically, in FIG. 6, each circle represents a state in the progression of hierarchy chain HCH, where a user may take one or more actions, each illustrated by a respective arrow, where the action may lead the user from one state to another. The states of FIG. 6 are as shown in the following Table 3, and each corresponds also to an icon in hierarchy chain HCH of FIG. 5, with the exception of state $S_5$ which represents the selection of a component.

TABLE 3

| State | Description |
|---|---|
| $S_1$ | Company |
| $S_2$ | Facility |
| $S_3$ | Building |
| $S_4$ | System(s) |
| $S_5$ | Component |

Figure 6:
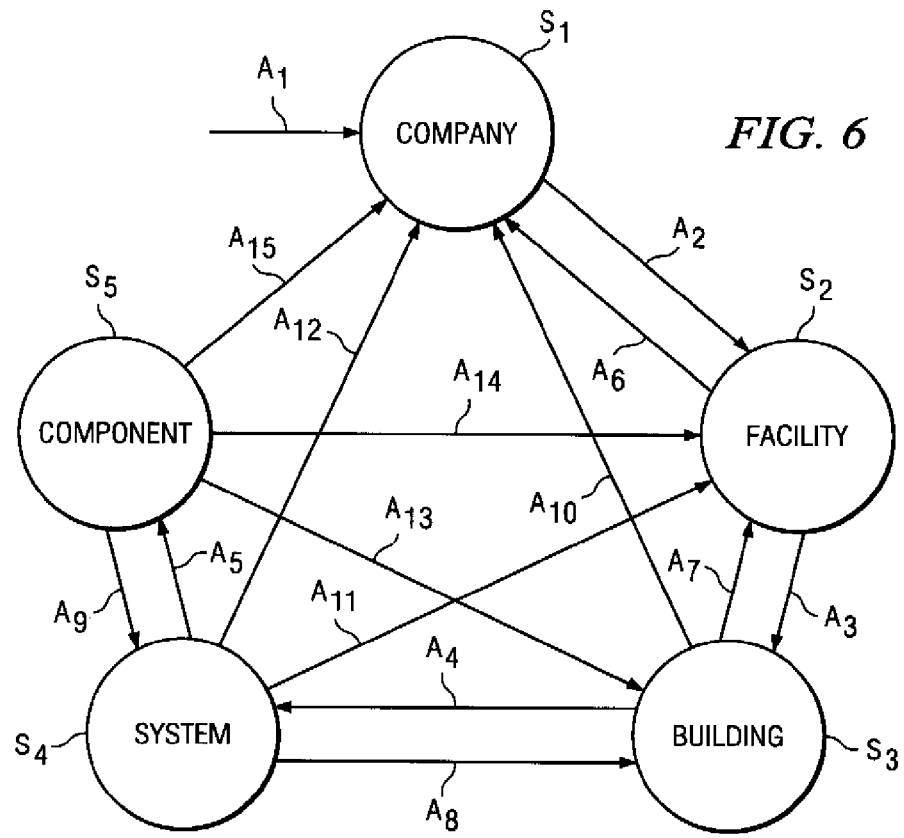
FIG. 6 illustrates a state diagram of a hierarchy chain HCH provided by the GUI of the preferred embodiment computer program.

Looking in greater detail to Table 3 and FIG. 6, a user of the preferred embodiment program may be first put in state $S_1$ by logging into the program, as discussed above, and assuming the user has access to only one company. As an alternative if the user has access to multiple companies, then he or she is first prompted by the program to select a company, and then performs an action $A_1$, represented as an arrow in FIG. 6 and which may be taken by clicking on a company icon, at which point the user is taken to the company level in hierarchy chain HCH, as shown earlier in FIG. 2. Thereafter, and from Table 3 as well as the illustration and previous discussion, one skilled in the art will appreciate that at any point in using the preferred embodiment program, a user may act to select any of the available states by inputting a selection, such as by clicking on an appropriate icon. For example, to move from state $S_1$ to state $S_2$, the user performs an act $A_2$ to click on a facility icon. As another example, to move from state $S_2$ to state $S_3$, the user performs an act $A_3$ to click on a building icon. Thus, a total of four such acts $A_2$ through $A_5$ may be taken, each time advancing the user to the next level in hierarchy HCH. Thus, these actions are summarized in the following Table 4:

TABLE 4

| Action | Description |
|---|---|
| $A_1$ | Log in, or with listing of multiple companies, select one company and move to the screen for the selected company |
| $A_2$ | With listing of multiple facilities, select one facility and move to the screen for the selected facility |
| $A_3$ | With listing of multiple buildings, select one building and move to the screen for the selected building |
| $A_4$ | With listing of multiple systems, select one system and move to the screen for the selected system (also see options presented in FIG. 5) |
| $A_5$ | With listing of multiple components, select one component and move to the screen for the selected component |

Continuing with FIG. 6, in addition to the ability to move sequentially from the first state $S_1$ toward the last state $S_5$, at any point during use of the program the user may backtrack or skip to a previous or lowered-number tier state from an existing state, again by clicking on the appropriate icon in hierarchy chain HCH. For example, returning briefly to FIG. 5 and its display $D_4$, instead of choosing a component or proceeding with one of the options RO, RGO, or MO, the user may select the building icon to return to the building state, at which point the user may select a different system (assuming the selected building has more than one system). Thus, returning to FIG. 6, an action for each such additional alternative step is shown in the following Table 5:

TABLE 5

| Action | Description |
|---|---|
| $A_6$ | Return from facility selection to company selection |
| $A_7$ | Return from building selection to facility selection |
| $A_8$ | Return from system selection to building selection |
| $A_9$ | Return from component selection to system selection |
| $A_{10}$ | Return from building selection to company selection |

TABLE 5-continued

| Action | Description |
|---|---|
| $A_{11}$ | Return from system selection to facility selection |
| $A_{12}$ | Return from system selection to company selection |
| $A_{13}$ | Return from component selection to building selection |
| $A_{14}$ | Return from component selection to facility selection |
| $A_{15}$ | Return from component selection to company selection |

Returning now to FIG. 5, a description is provided for each of the three options RO, RGO, and MO, with additional details on certain preferred aspects described later. Report options RO permits the creation and viewing (and setup in some instances) of various reports by various personnel, where after the setup process, may be logged and later reviewed along with certain automatic analyses on that data. Further, when each report in this report option RO is saved by a user, it is time stamped and saved into a database associated with network computer 20. Still further, in the preferred embodiment a calendar GUI is also provided so that reports later may be retrieved according to the date of their time stamp. More particularly, a calendar is projected and displays on the GUI a general calendar format, where in addition and for those days on which a report was time-stamped, an icon corresponding to the report is shown and preferably the icon is color-coded to indicate the type of report. Moreover, in the preferred embodiment, a mouse-rollover of such an icon displays a summary of some of the report information and the user may then click on the icon to bring up the report. Still further in this regard, in the preferred embodiment a user's calendar shows reports based on the authority given the user, so in some cases a user may see only those reports that the user created whereas for other users their calendar GUI displays reports that may include themselves and/or other persons, so, by way of example, a manager or senior person may see on a single calendar icons for reports created by multiple persons, such as junior persons, employees, subordinates and the like. Additional functionality that may be performed on saved reports include: emailing the report, including in one embodiment the ability to email the report in an HTML form that is similar or identical to that displayed by the GUI of the program; editing the report; printing the report; and the ability to change the report date. When a user chooses to view a type of report, they are displayed in a list and the user may then select from that list, by clicking on the desired report, provided the user has privileges to access the desired report. Reports and graphs option RGO provides users more detailed information about their accounts. Test numbers entered in the report section are used to monitor trends, get an account overview, and review systems. There are five kinds of graphs and tables in the preferred embodiment program, namely: (i) daily reporting; (ii) trend reports; (iii) test calibration; (iv) system review; and (v) inventory trends. In (i), a display provides the user a quick overview of the tests performed on a particular system and on a specific date. The test data to support the display are pulled from the service report and operator logs (and optionally from a controller or the like providing data logging), and color coding, as also detailed later, is preferably used on the report. In (ii), a display reports a charting of the readings of one or two tests over a specified period of time. If two tests are selected, they are both displayed on the same graph for comparison purposes. In (iii), test results and calibrations are displayed for any specific test. The user may select a test to view followed by a specified period of time, and optionally they also may select to include in the display notes and/or calibration entries for the selected test. In (iv), the user may select one or multiple components to graph and specify a period of time. Once the user has selected their criteria, a graph for every test run during the specified time is displayed. Each test run on the selected components during the specified period of time also appears in a chart, and a list of components used appears at the top of the display. In (v), a display reports a charting of inventory usage over a specified period of time.

Having introduced the various options in display $D_4$, additional attention is now directed to report option RO. Recall in general that report option RO provides an interface for persons of different classifications to perform various operations with respect to data, where a given person may have access to one or more such operations. In FIG. 5, only certain operations are shown, while it should be understood that an administrator or the like may remove or add certain operations so that they are not accessible to certain persons, where each person is identified when they first log in to the system as described earlier. Looking then to the case of FIG. 5, three different personnel classes are shown, namely, service persons, operators, and lab persons. In the preferred embodiment, each class is associated with certain tasks and may have different operation privileges relative to the methodology of the computer program. Service persons are generally those that are routinely taking measurements with respect to the water treatment system and are often employed by the company at issue or by a water treatment company. Operators are typically those employed by the company and, hence, operating the equipment at hand. Finally, lab persons are not so much distinguishable by their employer, but have report inputs that are typically those that will be available from a laboratory rather than while at the physical water system. In any event, while one operation option is shown, to view, for all three class of persons, note that in other embodiments different operation options may be provided to different ones of those persons (or subsets thereof), including a view (and edit) option, a create option, and a setup option. Various of these options are further explored below.

FIGS. 7A and 7B illustrate a screen display $D_5$, that is the preferable GUI projected to the user, such as on display 12, and that is provided to a service person as one of the three classes of persons introduced above when they select the option to create a data report. Further, the same interface may be provided to the other persons or may be modified based on the attributes of their other class (i.e., as visitor, operator, or lab). In the present example where a service person has selected the report, then as shown in the upper right corner display $D_5$ indicates "Service Report;" thus, were a different class of person making this selection, that other class would be identified, such as Visitor Report, Operator Report, Inventory Report, or Lab Report. Looking in more detail to the report GUI, a person user identification block 30 is shown near the right and which is automatically completed based on the login information provided by the user that recorded the data into the report. To its left is a facility identification block 40, where recall that the user navigated hierarchy chain HCH to select a facility, and that facility is therefore identified automatically in block 40. Next, a test column 50 is shown, with a number of test rows $50_1$ through $50_9$; note that the use of nine test rows is only by way of example and, thus, more or less of such tests may be included. Each test is one that might be expected that a service person may seek to perform at the facility, such as by taking appropriate measurements using equipment known in the art. Thus, these tests or measurements as well as others that may be included by the preferred embodiment program are summarized in the following Table 6:

TABLE 6

Water treatment tests

| Hardness, Total | pH | Sulfide | Vandate | Iron | Turbidity |
|---|---|---|---|---|---|
| Hardness, Calcium | Molybdate | Flourescence | Flow Rate | Conductivity | Boron |
| Hardness | Chlorine, Free | Volume Pressure | Temperature | Neutralized | Sulfate |
| Magnesium | Chlorine, Total | Chelant | Chlorine Dioxide | Sodium Sulfite | Tolytriazole |
| Alkalinity, P | Sodium Nitrite | Polymer | Oxygen | Bacteria Count | ORP |
| Alkalinity, OH | Phosphate | Dispersant | Corrosion Rate | Chlorides | Refrigerant Pressure |
| Alkalinity, M | Phosphonate | Corrosion Inhibitor | Silica | Flouride | Refrigerant |
| Conductivity | Ammonia | Biocide Level | Copper | ATP | |

Also in connection with the tests of Table 6 and test rows $50_1$ through $50_9$, note that different component columns are shown 60, 70, 80, and 90, where at each intersection of a test row $50_x$ with one of columns 60, 70, 80, and 90, there is a corresponding data entry cell if that test $50_x$ applies to the component of the given one of columns 60, 70, 80, and 90. Thus, note that certain tests apply to only some of those components, where such correspondence occurs only where there is a data cell shown at the intersection of a test row and a component column. For example, column 60 pertains to a City Water component at the selected facility, and note that it may be tested only per tests $50_1$, $50_2$, $50_3$, $50_4$, and $50_5$. As another example, column 70 pertains to a cooling tower component at the facility, and it may be tested per tests $50_1$ through $50_8$. Additional aspects of these tests are discussed below.

In the preferred embodiment, a user of the program is able to input either an acceptable range or limit, based on the test type and system, for various of the cells in FIGS. 7A-7B. Specifically, in another input screen not shown, the user is shown each test and system, and as desirable or appropriate enters the acceptable limit, or range limits where both an upper and lower boundary are desired, for the given measurement/test type. Indeed, therefore, in the preferable use of the program, the user or some other person with access to the program accesses this screen as part of an initial setup for a given test and component and provides the allowable limit or range limits before actual test measurements are taken. Thereafter, and returning to FIGS. 7A-7B, the limit or range limits are displayed on the service report as shown in FIGS. 7A-7B, and they also are used to provoke additional functionality detailed below. Before turning to such functionality, FIGS. 7A-7B illustrate numerous examples of either limits or range limits that previously have been input into the preferred embodiment program. For example, looking to data cell $65_1$ at the intersection of test row $50_1$ and column 60, a legend of "60-100" may be seen and has an indication, to its left and in column 50, as the "Limits" for this cell; thus, these numbers indicate the range limits that were previously input to the program, and they represent the boundaries of the test corresponding to that cell, which as shown by the legends in the figure is the range for acceptable calcium Hardness for the City Water component at the selected Redmund facility. Numerous other examples are shown in FIGS. 7A-7B and should be appreciated by one skilled in the art. In any event, given the displayed limit or range limits, a user of the program enters the numeric measurement pertaining to the cell. Entry of the data into a cell is completed when the user provides a certain completion indication, such as by clicking on an area of the GUI outside of the cell. Of course, other indications may be permitted, such as by hitting the Tab key or the like. Thus, upon such entry, the user may therefore see how the entered number compares to the displayed limit or range limits. However, should the numeric comparison not be noticed or studied, additional program functionality to assist in this regard is further detailed below.

Figure 8:
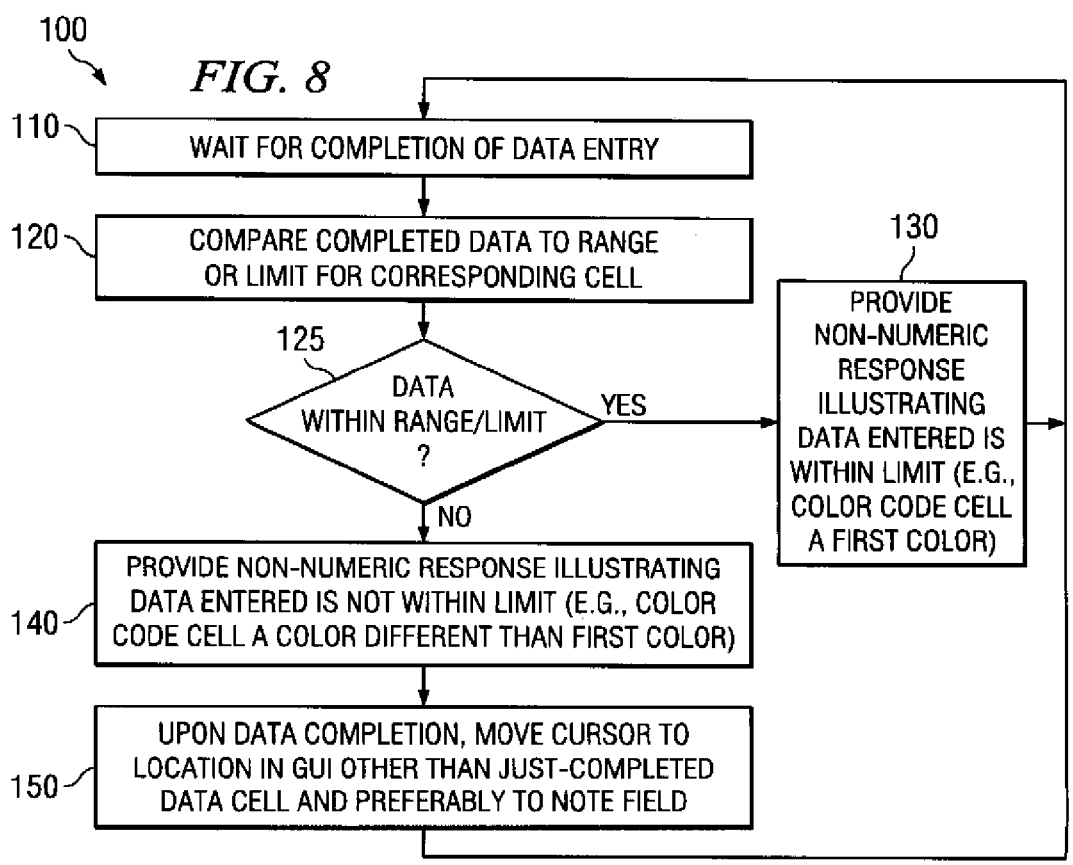
FIG. 8 illustrates a flow chart of the methodology of the computer program to compare a user-input numeric entry against the limit or range associated with the entry.

Also in the preferred embodiment, a user of the program is provided at least one real-time and non-numeric immediate response when completing each data entry into a report cell and that indicates how the entered data compares to the previously-input acceptable limit/range. Specifically, in the preferred embodiment, in response to the user's indication of completing the cell's data input, the program compares the numeric entry against the limit or range limits associated with the corresponding cell and one or possibly two responses to the comparison occur. These steps are now further detailed with reference to a method 100 shown by way of a flowchart in FIG. 8. In method 100, step 110 represents a wait state for data to be completed in a given cell, where once such completion occurs (e.g., by the user clicking in the GUI outside of the cell), then method 100 continues from step 110 to step 120. In step 120, the data entered in the cell is compared against the range or limit corresponding to that cell, and the following step 125 directs the flow of the program based on that comparison. Particularly, in step 125, if the data is within the applicable limit or range, method 100 continues from step 125 to step 130, whereas if the data is not within the applicable limit or range, method 100 continues from step 125 to step 140. Each of these alternative method flows is discussed below.

In step 130, having been reached because the entered data in a cell is within the applicable limit or range for that cell, the cell (or a part thereof including or adjacent to the data or the limit/range) is illuminated a color that thereby presents the data entry person or a subsequent viewer with a near-immediate and non-numeric visual signal of whether the entered data represents a satisfactory value. In the preferred embodiment, the step 130 color for the cell is green, so that when a user completes a cell's data entry, if he or she is presented with a green color in the cell this represents an affirmation that the entered value was within the limit or range limits. By way of example, therefore, in FIGS. 7A and 7B many of the data cells are in part colored green (the part being the limits, to contrast them to the entered data), with cell $65_3$ being such an example because its data entry of 80 falls within the cell's corresponding range of 60-100 and the green color shown by way of shading in the Figure. The remaining examples will be apparent to one skilled in the art. Accordingly, even if a user either intentionally or inadvertently fails to evaluate the numerically-shown limit discussed in the preceding paragraph, the user is provided with a color indication that may be more readily appreciated as indicating the acceptability of the measurement taken and entered into the appropriate cell. Following step 130, method 100 returns to step 110, therefore awaiting the entry of data into another cell.

In step 140, having been reached because the entered data is not within the applicable limit or range limits, the cell, or part thereof, is illuminated with a color (again shown in FIGS.

7A-7B by shading) that differs from that of step 130, thereby distinguishing the data entry as one that is not satisfactory. Moreover, in the preferred embodiment, the step 140 color is selected from one of three colors, based on the amount of difference of the entered data value as compared to the limit or range. For example: (i) if the test is slightly above or below a limit or range, the cell is illuminated yellow (e.g., FIG. 7A, cell $75_1$); (ii) if the test is moderately (i.e., more than slightly) above or below a limit or range, the cell is illuminated orange (e.g., FIG. 7A, cell $75_2$); and (iii) if the test is exceptionally above or below a limit or range, the cell is illuminated red (e.g., FIG. 7A, cell $75_6$). Moreover, in the preferred embodiment, the limits associated with each of these colors also may be entered into the program. For example, for an upper limit of 200, the user also may input that a value from 201 to 210 represents instance (i), a value from 211 to 220 represents instance (ii), and a value greater than 220 represents instance (iii). In any event, once the cell is colored per step 140, method 100 continues to step 150.

In step 150, which also is reached because the just-entered data is not within the applicable limit or range, the cursor is automatically moved by the program to a location in the GUI field that differs from the just-completed data cell or the location where the user clicked in the GUI to complete the data entry, where preferably the location to which the cursor is moved is a note field 150N, which is shown in part in the bottom of FIG. 7B. Thus, in addition to providing the user with a color indication of an out-of-limit/range data entry, the user is in effect interrupted from entering a next data entry because the cursor is automatically moved by the program to a different location in the GUI. In response, the user may then enter a textual description in response to the out-of-limit/range data entry. For example, the user may record an explanation of why the data entry is acceptable or may provide an indication of an action taken in an effort to improve the likelihood that the next measurement for the given cell will be within range/limit. Thus, in the example of FIG. 7B, it may be seen that the user has input the following text corresponding to the out of range cell $65_1$: "The city of Redmund has switched water sources. The new water source has high levels of hardness. We will adjust our water treatment program to compensate for the change in the make up water." Moreover, because certain data entries are expected to sometimes be out of range/limit, then in the preferred embodiment note field 150N also provides a drop-down selection, or the like, from which the user may select previously-stored phrases for certain conditions. For example, for a conductivity test that is out of range, a choice from the drop-down selection may be "Conductivity is above control limits. Please increase bottom blowdown immediately." If this statement is appropriate given an out-of-range/limit conductivity measurement, the user may select the statement and it will be entered into note field 150N, thereby directing a reader of the report to the appropriate action. Once step 150 is complete, method 100 returns to step 110, therefore awaiting the entry of data into another cell.

In addition to the preceding, note that other responses may be implemented by the preferred embodiment program in response to an out-of-range detection by step 125. As another response example, in another preferred embodiment, one or more person(s) may be associated with a test and the levels beyond the range/limit for that test, whereby each such person for a given test will receive an alarm the next time they log on to the program if the test designated for that person has a measurement that falls within the level also designated for that person. As an example, therefore, Bob Smith may have a setting that says any pH measurement that exceeds an acceptable range should result in an alarm generated to him, and as a result if step 125 finds that pH data is beyond the range/limit, then Bob Smith will receive an alarm the next time he logs into the preferred embodiment program. As another example, Mary Jones may have a setting that says only a pH measurement that is found to be beyond the greatest out of range extreme should result in an alarm generated to her, and as a result if step 125 finds that pH data is beyond that range/limit, then Mary Jones will receive an alarm the next time she logs into the preferred embodiment program, but if the pH measurement is less than that amount, and possibly still over the range/limit, she will not receive such an alarm. As still another response example, in another preferred embodiment, the person(s) discussed in the preceding example also may receive an email, without having to log into the program. Thus, looking at the previous example for Bob Smith, if a pH measurement is recorded into the program and is beyond the range/limit for that pH test, then the program provides as one response an email sent at that time to Bob Smith, so that he may be notified by that email of the out-of-range condition, even before he next time logs into the water treatment program. Still other examples may be ascertained by one skilled in the art.

Returning to FIG. 5, recall that one report provided by the preferred embodiment program is a laboratory (or "lab") report, and also in the preferred embodiment note that one of the different types of lab reports that is provided is referred to a coupon report. Before detailing that report and by way of background, note that it is known in the water treatment art to use a so-called coupon to evaluate the efficacy of certain water treatment processes. The coupon is a metal member that is placed into a water system and the effects of the water on the coupon, such as corrosion, pitting, and fouling, are subsequently measured by removing the coupon and analyzing it, where those effects determine if the water treatment, at the location where the coupon was located, is satisfactory. Metal coupons may be of different materials, where copper is often most desired, although other materials may be used, such as, by ways of example, copper alloys, aluminum, aluminum alloys, carbon, steel alloys and metals. In the present state of the art, typically a person obtains numerous coupons, each with a respective paper envelope. The envelope indicates a coupon number, which is also imprinted into the coupon itself. The person removes the coupon from the envelope and places it somewhere into the water system, and at that time the person is typically expected to record on the envelope the location at which the coupon has been placed as well as the date of that placement and the weight of the coupon at the time it was so placed. In an ideal situation, when the coupon is later removed from the water system, the imprinted number is observed and the envelope having the same number is retrieved; thus, at that point analyses may be made such as by weighing the coupon at that time and comparing its weight with that which was indicated on the envelope prior to the time the coupon was placed into the water system. However, as a practical matter, maintaining coupon envelopes is hardly a precise methodology and, indeed, often the coupons are misplaced or lost. Moreover, if corrosion is heavy, then the number imprinted on the coupon may be illegible at the time the coupon is removed from the system, thereby making it much more difficult, and sometimes impossible based on the envelope data, to match the coupon to its corresponding envelope. Thus, without the ability to match the coupon to its envelope (or locate the envelope at all), the possibility of a valid test is destroyed and an entire new time period is necessitated to once again place a coupon at that location and thereafter test it when a desirable test period (e.g., days, weeks, or even months) has elapsed. Lastly, in some instances there have been suspicions of inaccurate or misleading coupon test results given the informality with which some persons treat the coupon methodology. Returning then to the preferred embodiment, and in view of this background, various improvements are presented, as detailed below.

Figure 9:
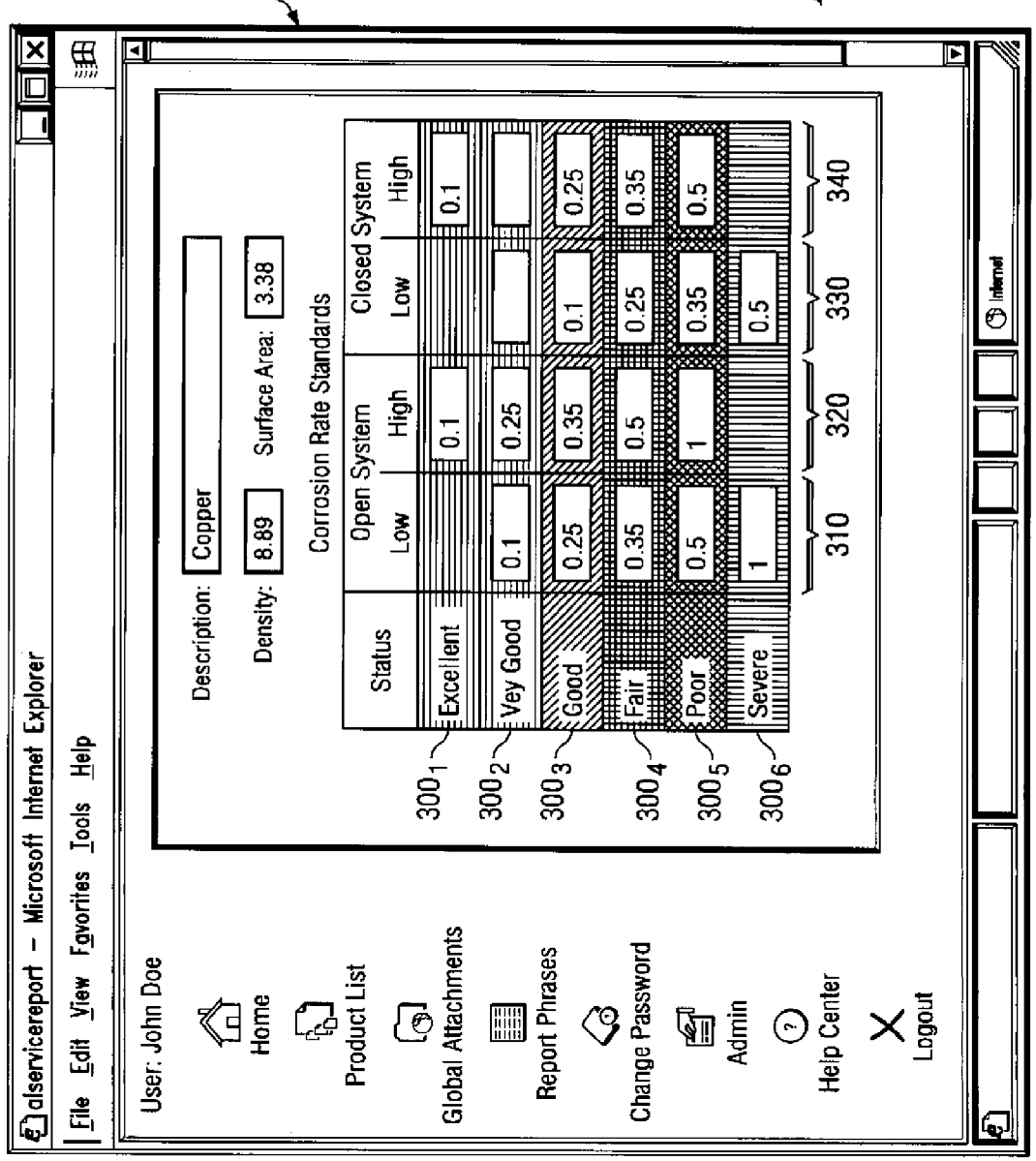
FIG. 9 illustrates a screen display $D_6$ that is the preferable GUI projected to the user for sake of permitting the user to input data limits with respect to a water treatment coupon.

FIG. 9 illustrates a screen display $D_6$, that is the preferable GUI projected to the user, such as on display 12, for sake of permitting the user to input corrosion rate data limits with respect to a water treatment coupon. In the preferred embodiment, six category rows $300_1$ through $300_6$ are provided, each representing a different level of coupon corrosion rate; as illustrated, the best performance is shown in category row $300_i$ with descending acceptability toward category row $300_6$, as shown by the corresponding status labels of excellent in row $300_1$ to severe in row $300_6$. Also in the preferred embodiment, a different color is assigned to each status descriptor, where by way of example the status label of "excellent" is colored blue, and the status label of "severe" is colored red (shown in the Figure by shading). The remaining colors, and their respective status descriptors, are as follows: (a) blue-green for "Very good;" (b) green for "Good;" (c) yellow for "Fair;" and (d) orange for "Poor." Also in display $D_6$, the user is provided cells for use of the coupon in an open system as shown by columns 310 and 320 as well as for use of the coupon in closed systems as shown by columns 330 and 340. Both of these types of systems are known in the art, but by way of brief explanation, the difference between the two is whether there is a requirement or ability for the system to communicate with an outside (i.e., open) water or atmospheric source. Thus, the system is closed if there is no such source, that is, the system is sealed to such an outside source, or it is open if there is such a source. By ways of example, a closed system might include a commercial (or residential) cooling system that is pressurized, and an open system might include the water system used for providing potable water in a business or home. In any event and returning to display $D_6$, cells are provided for the user to input high and low limits to thereby provide a corresponding range for each category in rows $300_2$ through $300_5$. Also, for rows $300_1$ and $300_6$, which represent the outer extremes, a single cell is shown per each system (i.e., either open or closed), representing, respectively, a limit above which a result is indicated as excellent and a limit below which a result is indicated as severe. Thus, given display $D_6$, a user of the preferred embodiment program may enter a description of a coupon type (e.g., its metal), its density, and its surface area. This information is used for subsequent analyses, as further detailed below.

Figure 10:
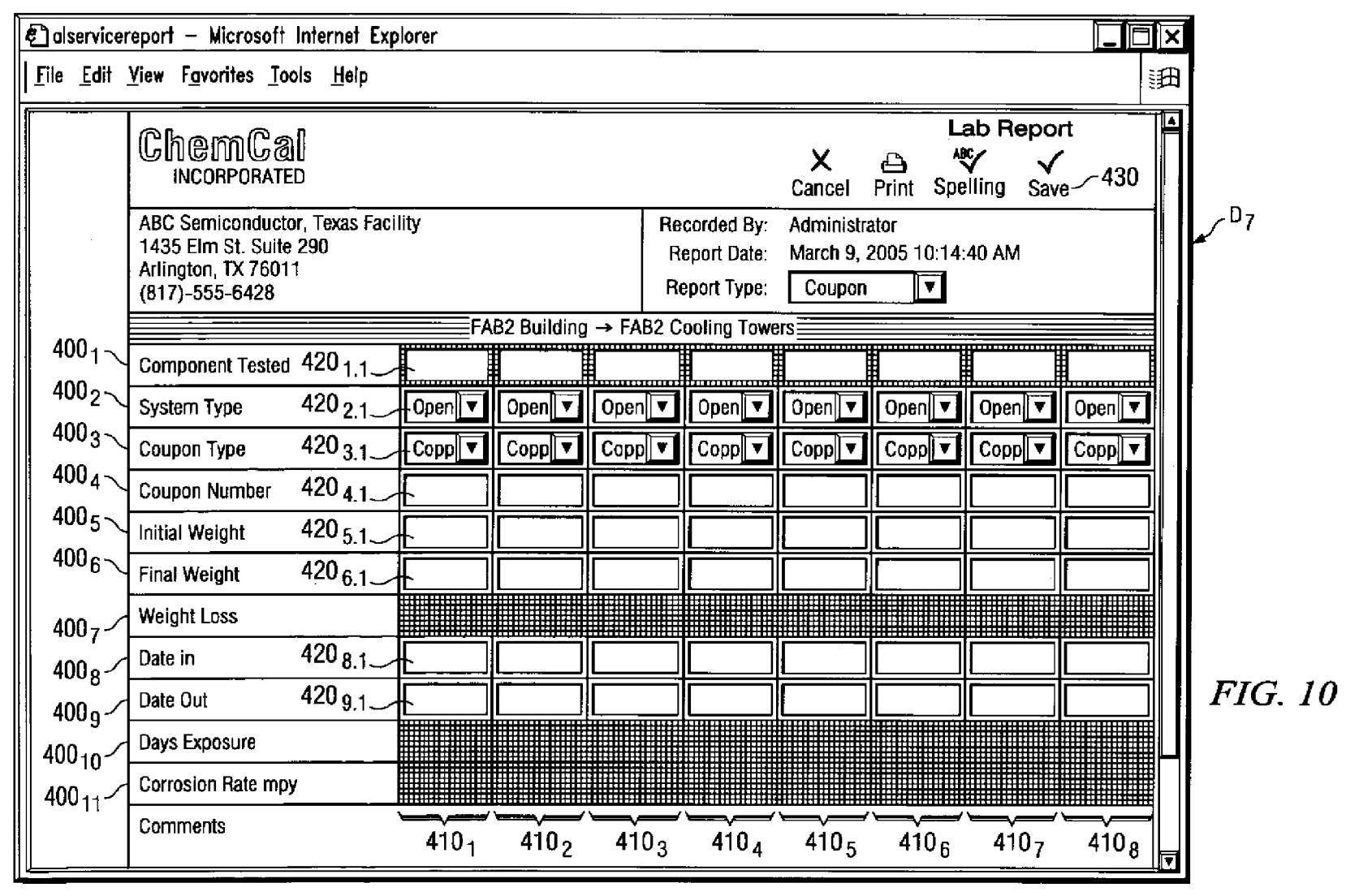

FIG. 10 illustrates a screen display $D_7$, that is the preferable GUI projected to the user, such as on display 12, for sake of permitting the user to input data measurements with respect to a water treatment coupon and to then or thereafter view analyses of the coupon corrosion rate based on the input data measurements. In display $D_7$, eleven rows $400_1$ through $400_{11}$ are displayed, and each pertains to the coupon(s) for which data may be input where rows $400_1$ through $400_6$ and $400_8$ and $400_9$ are for user inputs in that regard, while rows $400_7$ and $400_{10}$ through $400_{11}$ are program-determined values, based in response to the user-input values. Also, while not shown, an additional row may be included so that the user may input the location to which the coupon will be located in a water system. Further, and by way of example, display $D_7$ illustrates eight columns $410_1$ through $410_8$, each corresponding to a different coupon. In a cell $420_{1.1}$ a user may input the type of component being tested in connection with a given coupon. Then, in cells $420_{2.1}$ and $420_{3.1}$, respectively, the user may select from a drop down list the system type (i.e., open or closed) as well as the coupon material type. Also in display $D_7$, note that some cells are shown with rectangles therein, intending to illustrate to the user that such cells are for input data. Thus, by way of example in column $410_1$, these cells include cells $420_{4.1}$, $420_{5.1}$, $420_{6.1}$, $420_{8.1}$, and $420_{9.1}$.

Given the preceding, and also per use of the preferred embodiment, when the user inputs, with respect to display $D_7$, the corresponding data into each of cells $420_{4.1}$, $420_{5.1}$, $420_{6.1}$, $420_{8.1}$, and $420_{9.1}$ or comparable cells in other of columns $410_2$ through $410_8$, then in response to these inputs, the remaining cells in the corresponding column are calculated by the program and displayed. For example, weight loss is thus displayed in row $400_7$ as the difference between the cells of rows $400_6$ and $400_5$ from the same column. As another example, days of exposure is thus displayed in row $400_{10}$ as the difference between the cells of rows $400_9$ and $400_8$ from the same column. Still further, the program performs corrosion rate calculations and displays them in row $400_{11}$. Once the user has input data for one or more coupons (i.e., in one or more columns), the user may click on the save icon 430, which thereby saves the report so that it may be later retrieved for purposes of reviewing the data or adding thereto.

Figure 11:
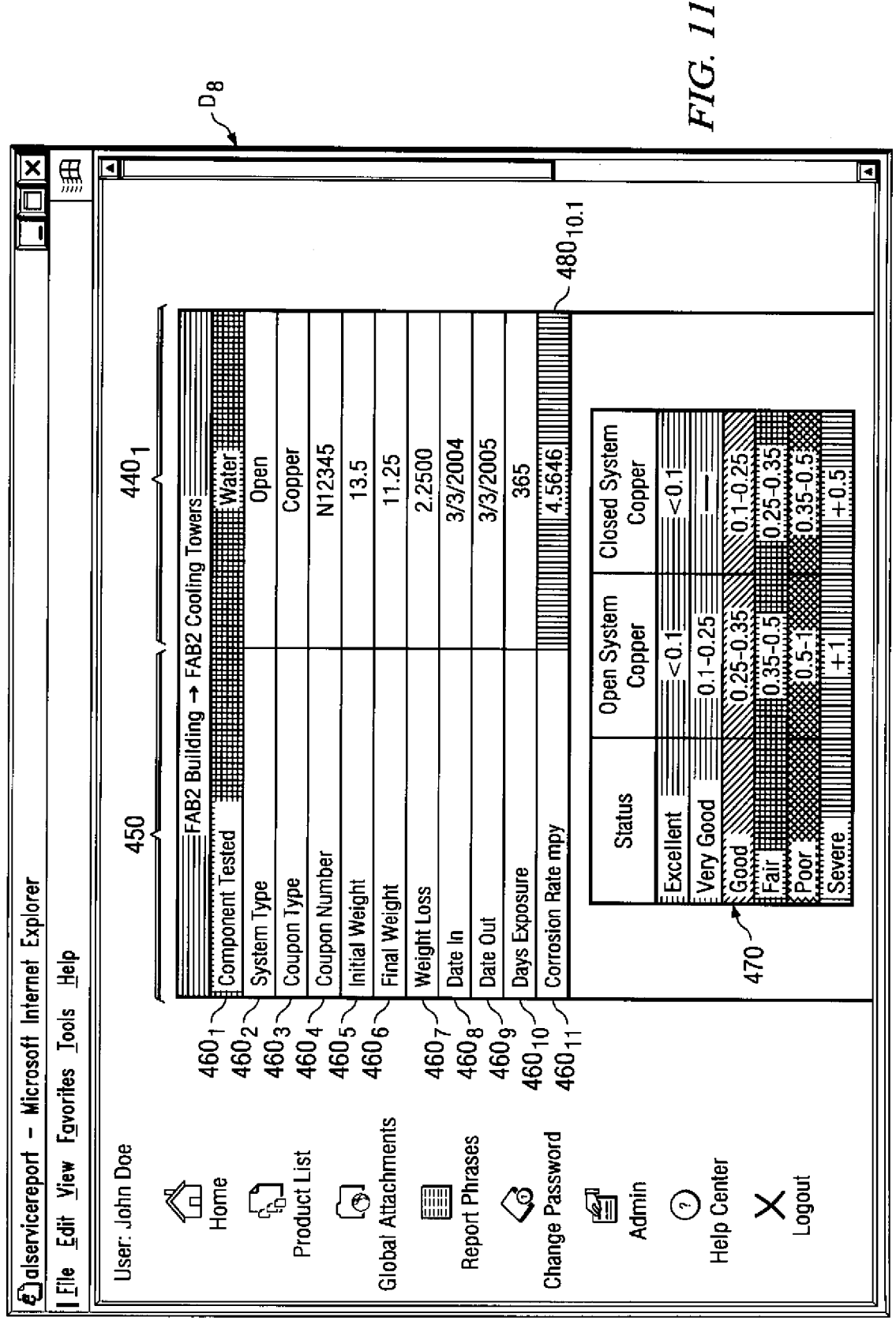
FIG. 11 illustrates a screen display $D_8$ that is the preferable GUI projected to the user once the user has input coupon data for at least one coupon as described above in connection with FIG. 10.

FIG. 11 illustrates a screen display $D_8$, that is the preferable GUI projected to the user, such as on display 12, once a user has input coupon data for at least one coupon as described above in connection with FIG. 10. In the example of display $D_8$, data has been input for only one coupon and, thus, only a single column $440_1$ of coupon data and analysis is shown, along with a column 450 of descriptor rows $460_1$ through $460_{11}$ for the data either as input or as determined by the program. Indeed, in the preferred embodiment, those values that are determined by the program and shown in rows $460_6$, $460_{10}$, and $460_{11}$ are preferably shown in a distinguishing color, such as by showing the user-input data and its text descriptors in black and the text/data in the program-determined rows in blue. Accordingly, the user's attention is quickly drawn to the program-determined numeric results due to the different color. Note also in the preferred embodiment that display $D_8$ may report on more than one coupon, in which case columns in the same form as column $440_1$ are added automatically to the display, with a reasonable limit on the number of columns preferably being the same as the number of input columns shown in FIG. 10 (e.g., eight columns). Further, note that if a user has not used up to the limit of all the columns, such as in the example of FIG. 10 where only a single column $440_1$ is used, then the user may click on an edit icon (not expressly shown) which will return the user to display $D_7$ of FIG. 10, at which time the user may input data for one or more additional coupons (i.e., and their corresponding columns) and then again save the report by clicking on the save icon 430, permitting subsequent access to display $D_8$ which will then include additional columns $440_x$ reporting on the added coupon data.

Also in FIG. 11, note that display $D_8$ includes a color-coded summary table 470 that is derived from the user inputs to screen display $D_6$ described above with respect to FIG. 9. Thus, table 470 includes the same category rows $300_1$ through $300_6$, with descriptors showing descending acceptability from "Excellent" to "Severe." Accordingly, the data previously entered into display $D_6$ is now shown in output form to reveal the previously-input limit and range numbers, and each row $300_x$ has a different color associated with it. In addition, however, note now that the preferred embodiment program also colors the cell of the calculated corrosion rate, at the intersection of row $460_{11}$ with column $440_1$ (or other columns, if they were added to the report), with the same color of where the result falls in table 470. By way of an example, display $D_7$ shows in a cell $480_{10.1}$ a result of 4.5646 for an open system (see row $460_2$), which as seen in table 470 is in the range for a "Severe" result, because it is greater than 0.5. As a result, therefore, the preferred embodiment program automatically compares the result of cell $480_{10.1}$ with the ranges and limits shown in table 470, and in response the program colors the cell holding that result with the same row color used in table 470 that has a range or limit that corresponds to the result. Thus, in this example, the color in table 470 for "Severe" is red, and since the result of 4.5646 corresponds to the limit (e.g., >0.5) of row $360_6$, then cell $480_{10.1}$ is colored red. As a result, the user's attention, when viewing the color of cell $480_{10.1}$, is directed to a match between that color and the "Severe" designation of the same color in row $360_6$, and the user is thereby quickly informed that the numeric result of the cell is Severe without having to himself/ herself compare that numeric value with other numeric values. This color coding thereby improves the chance that the user is accurately and easily informed of the result of the corrosion rate.

From the above, it may be appreciated that the preferred embodiments provide a computer program for use water treatment data management and related functionality, with various inventive aspects including various functionality provide through its GUI. Numerous benefits have been observed above and additional ones should be appreciated from the previous details. Indeed, as additional examples of benefits, the preferred embodiment program improves efficiency and reduces the possibility of human error when making implementing and evaluating various water treatments. As another example, an intuitive logical structure is provided so as to facilitate an organized and understandable approach to water treatment, at various levels. As yet another example, the time involved in analyzing data may be decreased and the interface and methodology of the resulting output should be well received by persons at various levels of treatment and interest. As yet another benefit, while the aspects described herein have particular application and benefits in the context of water treatment, various of these aspects may be used with respect to other companies, facilities, and systems as well. Thus, while various alternatives have been provided according to preferred embodiments, and still others may be ascertained by one skilled in the art, one skilled in the art should further appreciate that while the present embodiments have been described in detail, various substitutions, modifications or alterations could be made to the descriptions set forth above without departing from the inventive scope, as is defined by the following claims.

We claim:

1. A computer readable medium storing a computer program that when executed causes a computer to perform the steps of:
    displaying to a user of the computer a representation of a first hierarchical level representative of one or more companies, where each company of the one or more companies has respective water treatment needs;
    for each company of the one or more companies and while continuing to display a representation of the first hierarchical level, displaying to the user of the computer a representation of a second hierarchical level representative of one or more facilities for the respective company;
    for each facility of each company of the one or more companies and while continuing to display a representation of the first and second hierarchical levels, displaying to the user of the computer a representation of a third hierarchical level representative of one or more water treatment systems for the respective facility; and
    while continuing to display the representation of the third hierarchical level, permitting the user of the computer to backtrack to either of the first and second hierarchical levels by operating the computer to select a respective one of either the representation of the first hierarchical level or the representation of the second hierarchical level.

2. The computer program of claim 1 for operating the computer to perform the additional steps of:
    for each system of each facility, displaying to the user of the computer a fourth hierarchical level representative of one or more water treatment components for the respective system of a company; and
    responsive to a user input, returning from any level in the hierarchical level to a lower level in the hierarchical level.

3. The computer program of claim 1 for operating the computer to perform the additional step of, responsive to a user input, returning from any level in the hierarchical level to a lower level in the hierarchical level.

4. The computer program of claim 1 for operating the computer to perform the additional step of for each facility and while continuing to display the first hierarchical level, displaying to the user of the computer a representation of an additional hierarchical level representative of one or more buildings for the respective facility.

5. The computer program of claim 4 for operating the computer to perform the additional step of while continuing to display the representation of the third hierarchical level, permitting the user of the computer to backtrack to either of the first, second, and additional hierarchical levels by operating the computer to select a respective one of either the representation of the first hierarchical level or the representation of the second hierarchical level or the representation of the additional hierarchical level.

6. The computer program of claim 4 wherein the step of displaying to the user of the computer a representation of an additional hierarchical level representative of one or more buildings for the respective facility occurs between the step of displaying to a user of the computer a representation of a second hierarchical level and the step of displaying to a user of the computer a representation of a third hierarchical level.

7. The computer program of claim 1 for operating the computer to perform the additional step of for each system of each facility and while continuing to display the first, second, and third hierarchical levels, displaying to the user of the computer a fourth hierarchical level representative of one or more water treatment components for the respective system of a company.

8. The computer program of claim 7 and further comprising the step of while continuing to display a representation of the fourth hierarchical level, permitting the user of the computer to backtrack to any of the first, second, and third hierarchical levels by operating the computer to select a respective one of either the representation of the first hierarchical level or the representation of the second hierarchical level or the representation of the third hierarchical level.

9. The computer program of claim 7 wherein the step of displaying to a user of the computer a representation of a first hierarchical level representative of one or more companies is responsive to one of either user privilege access or user selection.

10. The computer program of claim 9 wherein each of the displaying steps comprises displaying an icon representative of one of any of each the company, each facility, each system, and each component.

11. The computer program of claim 10:
  wherein the step of displaying to the user of the computer a representation of a second hierarchical level is in response to a user selection based on the first hierarchical level; and
  wherein the step of displaying to the user of the computer a representation of a third hierarchical level is in response to a user selection based on the second hierarchical level.

12. The computer program of claim 1 wherein the step of displaying to the user of the computer a representation of a third hierarchical level is in response to a user selection based on the second hierarchical level.

13. The computer program of claim 12 for operating the computer to perform the additional step of receiving water treatment data for components in a system at the third hierarchical level.

14. The computer program of claim 13 for operating the computer to perform the additional step of receiving a limit in a form of at least one of an absolute limit or a range corresponding to a water treatment measurement.

15. The computer program of claim 13 for operating the computer to perform the additional steps of:
  receiving a user input representing completion of a data input entry, and in response the steps of:
    comparing received water treatment data to a previously established limit; and
    providing at least one non-numeric response in response to the comparing step.

16. The computer program of claim 15:
  wherein the step of providing at least one non-numeric response comprises displaying in connection with the received water treatment data a first color if the received water treatment data is within the previously established limit and displaying in connection with the received water treatment data a second color, different from the first color, if the received water treatment data is not within the previously established limit;
  wherein the step of receiving a user input representing completion of a data input entry comprises receiving the data input at a first location on a graphical user interface; and
  wherein the step of providing at least one non-numeric response further comprises moving a cursor on the graphical user interface from the first location to a second location on the graphical user interface.

17. The computer program of claim 15 wherein the step of providing at least one non-numeric response comprises displaying in connection with the received water treatment data a first color if the received water treatment data is within the previously established limit and displaying in connection with the received water treatment data a second color, different from the first color, if the received water treatment data is not within the previously established limit.

18. The computer program of claim 17 wherein the step of displaying in connection with the received water treatment data in a second color comprises selecting the second color from a plurality of colors differing from the first color, and wherein the selecting step selects based on an extent to which the received water treatment data is not within the previously established limit.

19. The computer program of claim 15:
  wherein the step of receiving a user input representing completion of a data input entry comprises receiving the data input at a first location on a graphical user interface; and
  wherein the step of providing at least one non-numeric response comprises moving a cursor on the graphical user interface from the first location to a second location on the a graphical user interface.

20. The computer program of claim 19:
  wherein the user is able to input alphanumeric characters to appear at the second location; and
  wherein the input alphanumeric characters may be selected from phrases previously input to the computer program.

21. The computer program of claim 1 wherein the step of displaying to a user of the computer a first hierarchical level representative of one or more companies is responsive to one of either user privilege access or user selection.

22. The computer program of claim 21 wherein each of the displaying steps comprises displaying an icon representative of one of any of each the company, each facility, and each system.

23. The computer program of claim 22:
  wherein the step of displaying to the user of the computer a second hierarchical level is in response to a user selection based on the first hierarchical level; and
  wherein the step of displaying to the user of the computer a third hierarchical level is in response to a user selection based on the second hierarchical level.

24. The computer program of claim 23 for operating the computer to perform the additional step of receiving water treatment data for components in a system at the third hierarchical level.

25. The computer program of claim 24 for operating the computer to perform the additional step of receiving a limit in a form of at least one of an absolute limit or a range corresponding to a water treatment measurement.

26. The computer program of claim 25 for operating the computer to perform the additional steps of:
  receiving a user input representing completion of a data input entry, and in response the steps of:
    comparing received water treatment data to a corresponding limit; and
    providing at least one non-numeric response in response to the comparing step.

27. The computer program of claim 26 wherein the step of providing at least one non-numeric response comprises displaying in connection with the received water treatment data a first color if the received water treatment data is within the corresponding limit and displaying in connection with the received water treatment data a second color, different from the first color, if the received water treatment data is not within the corresponding limit.

28. The computer program of claim 27 wherein the step of displaying in connection with the received water treatment data in a second color comprises selecting the second color from a plurality of colors differing from the first color, and wherein the selecting step selects based on an extent to which the received water treatment data is not within the corresponding limit.

29. The computer program of claim 28:
  wherein the step of receiving a user input representing completion of a data input entry comprises receiving the data input at a first location on a graphical user interface; and
  wherein the step of providing at least one non-numeric response comprises moving a cursor on the graphical user interface from the first location to a second location on the a graphical user interface.

30. The computer program of claim 29:
  wherein the user is able to input alphanumeric characters to appear at the second location; and wherein the input alphanumeric characters may be selected from phrases previously input to the computer program.

31. The computer program of claim 30:
wherein the step of providing at least one non-numeric response comprises displaying in connection with the received water treatment data a first color if the received water treatment data is within the corresponding limit and displaying in connection with the received water treatment data a second color, different from the first color, if the received water treatment data is not within the corresponding limit;
wherein the step of receiving a user input representing completion of a data input entry comprises receiving the data input at a first location on a graphical user interface; and
wherein the step of providing at least one non-numeric response further comprises moving a cursor on the graphical user interface from the first location to a second location on the graphical user interface.

32. The computer program of claim 1 for operating the computer to perform the additional step of providing a graphical interface to receive a first set of parameters for at least a first water treatment coupon.

33. The computer program of claim 32 wherein the first set of parameters comprise a coupon identification number and a coupon weight prior to placing the first water treatment coupon into a water system.

34. The computer program of claim 33 wherein the first set of parameters further comprise an indication of a date when the first water treatment coupon is placed into a water system.

35. The computer program of claim 33 wherein the first set of parameters further comprise an indication of a location at which the first water treatment coupon is placed into a water system.

36. The computer program of claim 32 for operating the computer to perform the additional steps of:
providing an interface to receive a second set of parameters for the at least a first water treatment coupon; and
determining a set of coupon-related analysis data by comparing selected data from the second set of parameters with selected data from the first set of parameters.

37. The computer program of claim 36 wherein one measure in the analysis is a corrosion rate of the corresponding coupon.

38. The computer program of claim 37:
wherein the first set of parameters comprise a coupon weight prior to placing the first water treatment coupon into a water system and a date of placement of the first water treatment coupon into a water system; and
wherein the second set of parameters comprise a coupon weight after removing the first water treatment coupon from the water system and a date of removal of the first water treatment coupon from a water system.

39. The computer program of claim 37 wherein the step of determining a set of coupon-related analysis data comprises displaying in connection with the corrosion rate of the corresponding coupon a first color if the corrosion rate is within a previously established limit and displaying in connection with the corrosion rate a second color, different from the first color, if the corrosion rate is not within the previously established limit.

40. The computer program of claim 39 wherein the step of displaying in connection with the corrosion rate a second color comprises selecting the second color from a plurality of colors differing from the first color, and wherein the selecting step selects based on an extent to which the corrosion rate is not within the previously established limit.

41. The computer program of claim 39 wherein the step of displaying in connection with the corrosion rate either a first color or a second color further comprises displaying a table with numeric limits corresponding to the first color and the second color.

42. The computer program of claim 41 wherein the program is further for providing a graphical interface to receive as user input limits for the table used in the step of displaying a table with numeric limits.

43. A computer readable medium storing a computer program that when executed causes a computer to perform the steps of:
displaying to a user of the computer in a graphical interface for receiving a limit in a form of at least one of an absolute limit or a range corresponding to a water treatment measurement;
receiving from the user the limit;
displaying to a user of the computer in the graphical interface a user input interface for receiving a data input entry, and in response operating the computer to perform the steps of:
receiving from the user a water treatment data input entry;
comparing the water treatment data or data determined therefrom to the limit; and
providing at least one non-numeric response in response to the comparing step; and
wherein the step of providing at least one non-numeric response comprises displaying in connection with the received water treatment data a first color if the received water treatment data is within the corresponding limit and displaying in connection with the received water treatment data a second color, different from the first color, if the received water treatment data is not within the corresponding limit.

44. The computer program of claim 43 wherein the step of displaying in connection with the received water treatment data in a second color comprises selecting the second color from a plurality of colors differing from the first color, and wherein the selecting step selects based on an extent to which the received water treatment data is not within the corresponding limit.

45. A computer readable medium storing a computer program that when executed causes a computer to perform the steps of:
displaying to a user of the computer in a graphical interface for receiving a limit in a form of at least one of an absolute limit or a range corresponding to a water treatment measurement;
receiving from the user the limit;
displaying to a user of the computer in the graphical interface a user input interface for receiving a data input entry, and in response operating the computer to perform the steps of:
receiving from the user a water treatment data input entry;
comparing the water treatment data or data determined therefrom to the limit; and
providing at least one non-numeric response in response to the comparing step; and
wherein the step of receiving a user input representing completion of a data input entry comprises receiving the data input at a first location on a graphical user interface; and
wherein the step of providing at least one non-numeric response comprises moving a cursor on the graphical user interface from the first location to a second location on the graphical user interface.

46. The computer program of claim 45 wherein the step of providing at least one non-numeric response comprises, in response to the data being out of compliance with the limit, moving a cursor on the graphical user interface from the first location to a second location on the graphical user interface.

47. The computer program of claim 45 wherein the second location comprises a data entry field.

48. The computer program of claim 45 wherein the second location comprises a plurality of previously-stored phrases from which the user may select to enter data into the second location.

49. A computer readable medium storing a computer program that when executed causes a computer to perform the steps of:
- displaying to a user of the computer a graphical interface to receive a set of limits for at least a first water treatment coupon, wherein each limit in the set of limits is in a form of at least one of an absolute limit or a range corresponding to a water treatment measurement;
- receiving from the user the set of limits;
- displaying to a user of the computer a graphical interface to receive a set of parameters for at least a first water treatment coupon;
- receiving from the user the set of parameters; and
- determining a set of coupon-related analysis data by comparing selected data calculated from the set of parameters with selected data from the set of limits;
- wherein one measure in the analysis is a corrosion rate of the corresponding coupon
- wherein the step of determining a set of coupon-related analysis data comprises displaying in connection with the corrosion rate of the corresponding coupon a first color if the corrosion rate is within a corresponding limit and displaying in connection with the corrosion rate a second color, different from the first color, if the corrosion rate is not within the corresponding limit.

50. The computer program of claim 49 wherein the step of displaying in connection with the corrosion rate a second color comprises selecting the second color from a plurality of colors differing from the first color, and wherein the selecting step selects based on an extent to which the corrosion rate is not within the corresponding limit.

51. The computer program of claim 49 and further comprising concurrently displaying to the user the set of limits and the set of coupon-related analysis.

52. A computer readable medium storing a computer program that when executed causes a computer to perform the steps of:
- displaying to a user of the computer a graphical interface to receive a set of limits for at least a first water treatment coupon, wherein each limit in the set of limits is in a form of at least one of an absolute limit or a range corresponding to a water treatment measurement;
- receiving from the user the set of limits;
- displaying to a user of the computer a graphical interface to receive a set of parameters for at least a first water treatment coupon;
- receiving from the user the set of parameters; and
- determining a set of coupon-related analysis data by comparing selected data calculated from the set of parameters with selected data from the set of limits;
- wherein the step of displaying in connection with the corrosion rate either a first color or a second color further comprises displaying a table with numeric limits corresponding to the first color and the second color.

53. A computer readable medium storing a computer program that when executed causes a computer to perform the steps of:
- displaying to a user of the computer a graphical interface to receive a set of limits for at least a first water treatment coupon, wherein each limit in the set of limits is in a form of at least one of an absolute limit or a range corresponding to a water treatment measurement;
- receiving from the user the set of limits;
- displaying to a user of the computer a graphical interface to receive a set of parameters for at least a first water treatment coupon;
- receiving from the user the set of parameters; and
- determining a set of coupon-related analysis data by comparing selected data calculated from the set of parameters with selected data from the set of limits;
- wherein the step of displaying to a user of the computer a graphical interface to receive a set of parameters comprises displaying an option to indicate whether the first water treatment coupon is located in an open system or a closed system.

* * * * *